United States Patent [19]

Anderson et al.

[11] Patent Number: 4,485,345

[45] Date of Patent: Nov. 27, 1984

[54] METHOD AND APPARATUS FOR CONDUCTING GROUND MAGNETIC SURVEYS

[76] Inventors: Christian D. Anderson, 826 Dorchester Ave., Winnipeg, Manitoba, Canada, R3M 0R7; James R. Loiselle, 731 Sabrina Rd. SW., Calgary, Alberta, Canada, T2W 0P4

[21] Appl. No.: 569,839

[22] Filed: Jan. 11, 1984

Related U.S. Application Data

[63] Continuation-in-part of Ser. No. 270,922, Jun. 5, 1981, abandoned.

[51] Int. Cl.³ .................. G01V 3/08; G01V 3/165; G01V 3/36
[52] U.S. Cl. .................. 324/345; 346/23; 346/33 R
[58] Field of Search ............... 324/331, 345, 346, 244; 346/23, 33 R

[56] References Cited

U.S. PATENT DOCUMENTS

| | | | |
|---|---|---|---|
| 1,906,271 | 5/1933 | Jakosky | 324/345 |
| 2,407,202 | 9/1946 | Vacquier | 324/345 X |
| 2,610,226 | 9/1952 | Klaasse et al. | 324/331 |
| 2,730,673 | 1/1956 | Jakosky | 324/345 |
| 2,899,637 | 8/1959 | Stein | 324/331 X |
| 2,902,636 | 9/1959 | Coker et al. | 324/345 |

OTHER PUBLICATIONS

White, Anthony, "A Sea Floor Magnetometer for the Continental Shelf", Marine Geophysical Researches 4, no. 1, Aug. 1979, pp. 105–114, copyright 1979, D. Reidel Pub. Co.

Primary Examiner—Gerard R. Strecker
Attorney, Agent, or Firm—Stanley G. Ade

[57] ABSTRACT

A method and apparatus are disclosed for conducting ground or near ground magnetic surveys in which the magnetic field measurements of the earth's total field, a component thereof, or a combination of components thereof, are made at continuous or near continuous (less than 20 feet intervals) measurement intervals. These measurements are recorded in analog or digital format by the apparatus which may include a corresponding chart recorder, recording on chart paper, magnetic tape or any appropriate recording device. The device includes manual switches for advancing the chart, making a recording, making a fiducial mark and for reversing the polarity of recording of the reading from the magnetometer.

2 Claims, 5 Drawing Figures

METHOD AND APPARATUS FOR CONDUCTING GROUND MAGNETIC SURVEYS

BACKGROUND OF THE INVENTION

This invention relates to a method and apparatus for conducting ground or near ground magnetic surveys in the search for economic mineral deposits and is a continuation-in-part application of U.S. Ser. No. 270,922 filed June 5, 1981 and now abandoned.

More specifically, this invention relates to a method and apparatus whereby magnetic field measurements of the earth's total field, a field component, or combination of field components, are made at continuous or at nearly continuous measurement intervals, with said measurements being recorded in either or both analog and digital formats, synchronously by the apparatus. The recording may be done on the appropriate chart paper, on magnetic tape, or utilizing any appropriate recording device.

The magnetic method of geophysical exploration has been in use many years by the mining industry in its search for economic mineral deposits. Many of these deposits or the surrounding host rocks contain some magnetic minerals, notably magnetite, ilmenite or pyrrhotite, which may be detected directly by the magnetic survey, and the resulting data used as a guide to the location of economic mineral deposits.

During the early years of mineral exploration, balance and torsion magnetometers such as the Schmidt and Askania units were in common use. These units were mounted on bulky tripods, requiring 1–2 minutes per reading set up time, depending on the skill of the operator. As a consequence of the long set up time, a 50 or 100 foot measurement interval was required in order to maintain survey costs at tolerable levels. With the advent of the new electronic magnetometers such as the fluxgate and proton precession units, the largest consumer of time/reading shifted from the magnetometer to the operator, who had to read the magnetometer output and write the value in the data book. Even with the time/reading drop from two minutes in 1950 to 30 seconds in 1970, mining companies maintained the use of the 50 and 100 foot sample intervals in their magnetometer survey.

These conventional sampling intervals were maintained by the mining companies primarily for two reasons. Firstly, it was a commonly held belief that the information content of the data provided by the use of a continuous or near continuous measurement interval was not significantly greater than that obtained using a 50 or 100 foot measurement interval. Secondly, the survey time and cost required to conduct a ground magnetic survey, using a continuous, to near continuous measurement interval, with conventional magnetic survey techniques and instrumentation, was prohibitive.

SUMMARY OF THE INVENTION

It is one object to provide an apparatus for carrying out magnetic surveys on foot where the information is rapidly and readily displayed to the operator for study, enabling surveys to be made economically at short sampling intervals.

Accordingly, the invention provides an apparatus for conducting magnetic surveys of the surface or sub-surface geophysical structures or lithologies comprising a magnetometer and recording means for directly recording readings from said magnetometer on a visual recording medium both of which are manually transportable by an operative whereby the operative can move from one recording location to the next on foot, said recording means including switch means manually operable by said operative for actuating the recording of a reading at said location from said magnetometer on said recording medium, manually operable switch means for advancing the recording medium in steps of predetermined length, manually operable switch means for actuating the recording of a fiducial mark on the recording medium and manually operable switch means for reversing the polarity of recording of chosen ones of said readings on said visual recording medium.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Our research and observations have shown that the above reasoning is erroneous in its assumptions, as will be shown by the following development. It is a commonly observed fact that earth structures such as faults, shear zones, dikes, veins, etc. or lithologic variations due to bedding, may have narrow width dimensions on the order of 10–15 feet or less, and correspondingly long strike dimensions of several hundred feet. These features may be economically valuable if their economic mineral content is high, or if they bear a formative relationship to a larger body of mineralization. The scientific value of these features may also be significant, particularly if they aid in geologic mapping or structural interpretation of an area. Since the physical dimensions are commonly small in width dimension (usually less than 15 feet), and quite large in strike dimension, the magnetic field produced by these features will take on corresponding dimensions.

Figure 1:
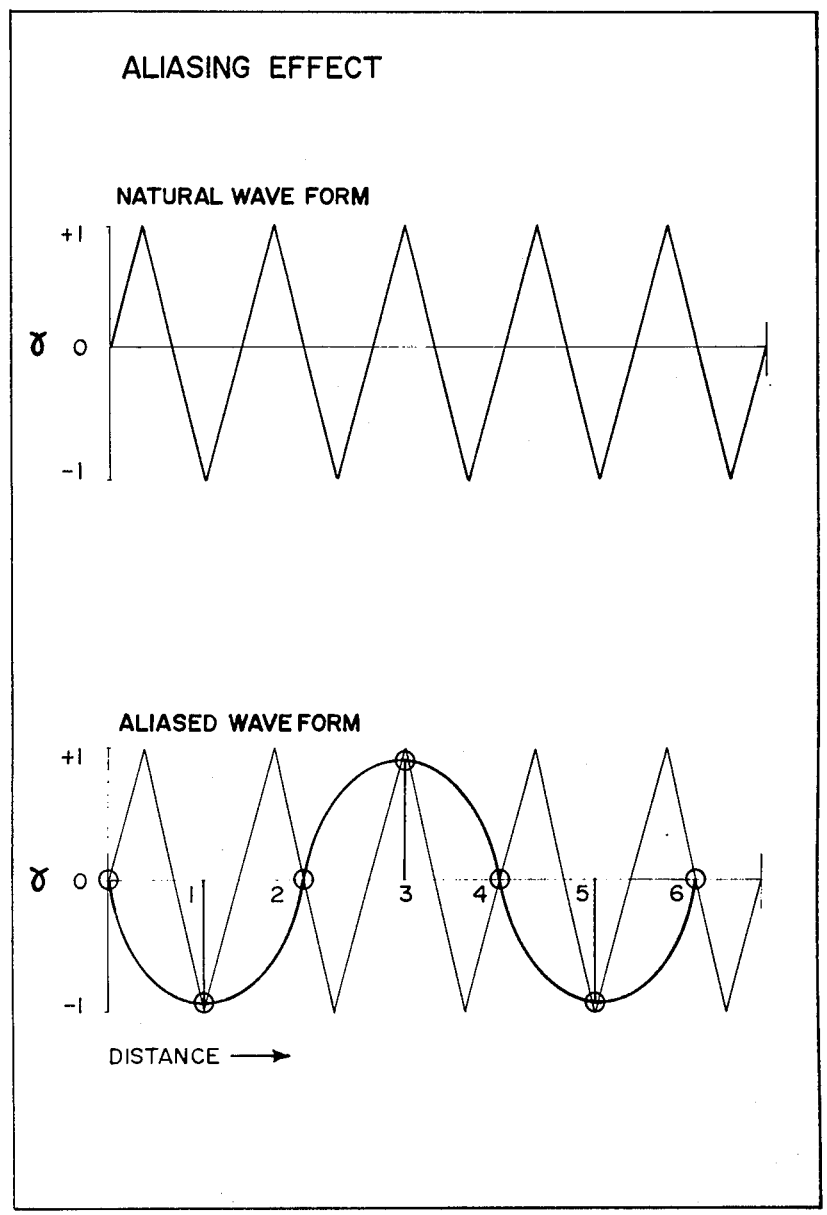
FIG. 1 shows a representation of a natural waveform and a representation of an aliased waveform.
Figure 2:
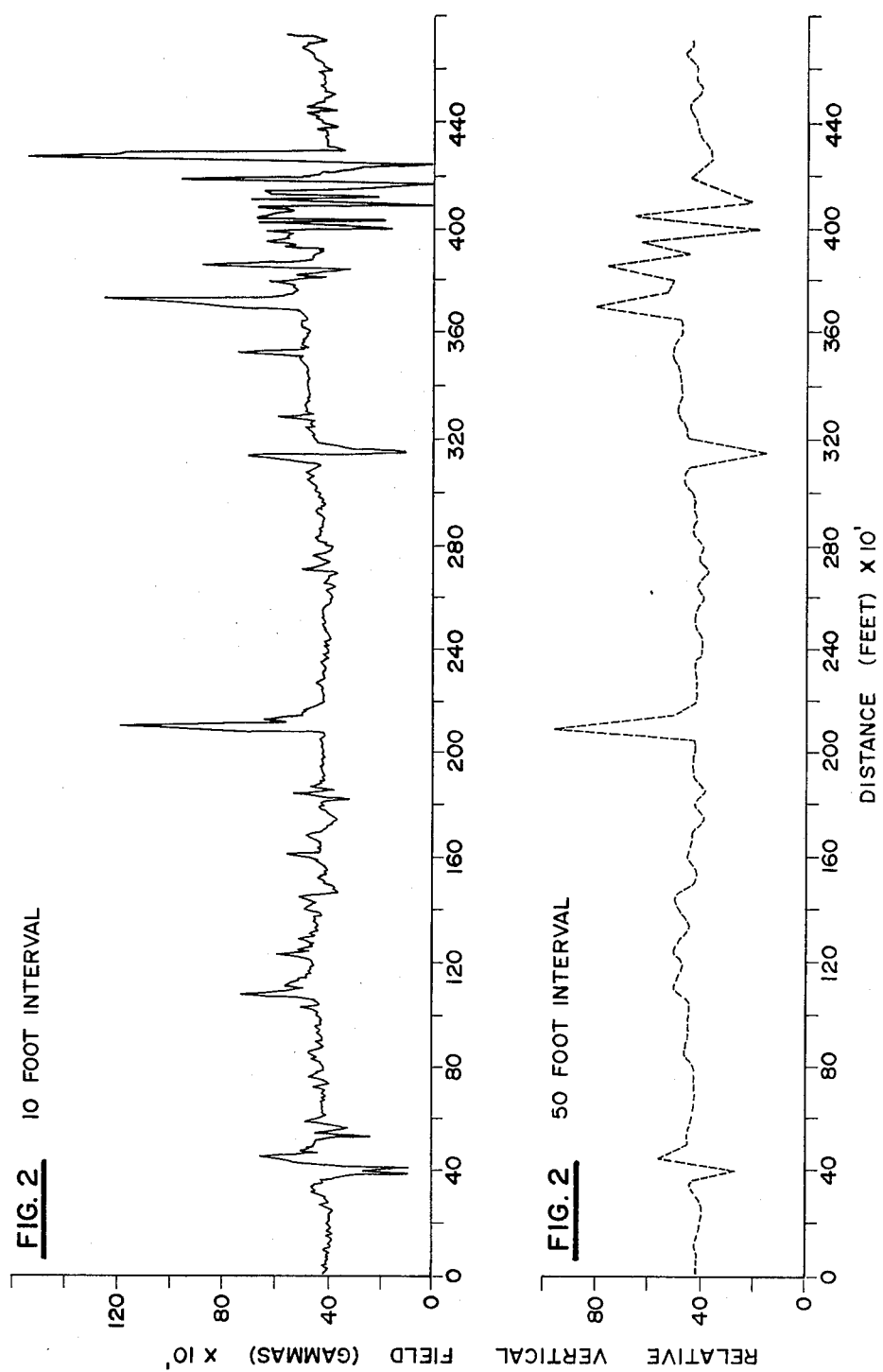
FIG. 2 illustrates the results of an actual survey showing the aliasing phenomena present with relatively large sampling spacing as compared with the results produced with a smaller distance.

If such areas, consisting of high spacial frequency magnetics (magnetic field variation as magnetic sensor is carried over units of differing magnetic susceptibility) are sampled using an inadequate sampling interval, a distinct aliasing of the frequency characteristics will take place. This aliasing phenomena is one of the major problems involved with the collection of magnetic information at conventional sampling intervals of 50 to 100 feet. Aliasing occurs when the sampling frequency is less than 0.5 cycle of the spacial variations in the magnetic field intensity produced by geologic features of small dimensions, effectively cutting off frequencies greater than half the magnetic variation frequency. This cut-off point is termed the Nyquist frequency, and is illustrated in FIG. 1. In this figure a uniformly varying sawtooth waveform representing the spacial variation in magnetic intensity, has intrinsic frequency and amplitude characteristics which are dependent on the dimensions, orientation, and magnetic properties of the underlying geology. When this waveform is sampled at discrete intervals with a frequency less than the Nyquist frequency, a waveform devoid of the original frequency and amplitude characteristics will result (aliased waveform). This effect then manifests itself in actual magnetic survey data by decreasing the frequency and amplitude content of the profiles as progressively larger sampling intervals are used. This sort of aliasing phenomena is shown to exist in actual survey data in FIG. 2. This figure represents a section of a magnetic traverse made over a steeply dipping (70–90 degrees), meta-volcanic pile in the area of the Manitoba-Ontario, Canada border. Shear zones within this area, produced by the faulting of the volcanic sequences are commonly mineralized by sulfides containing a fairly high percentage of pyrrhotite (a magnetic sulfide mineral). As can be seen from the magnetic survey results using a 10 foot sampling interval (solid line), these zones are characterized by very high spacial frequency variations, with periods ranging from 10–20 feet, and associated amplitude variations of 7000 nT. This same area when viewed with a larger sampling interval of 50 feet (dashed line), shows only low frequency characteristics and amplitude variations which do not mirror the actual situation.

Figure 3:
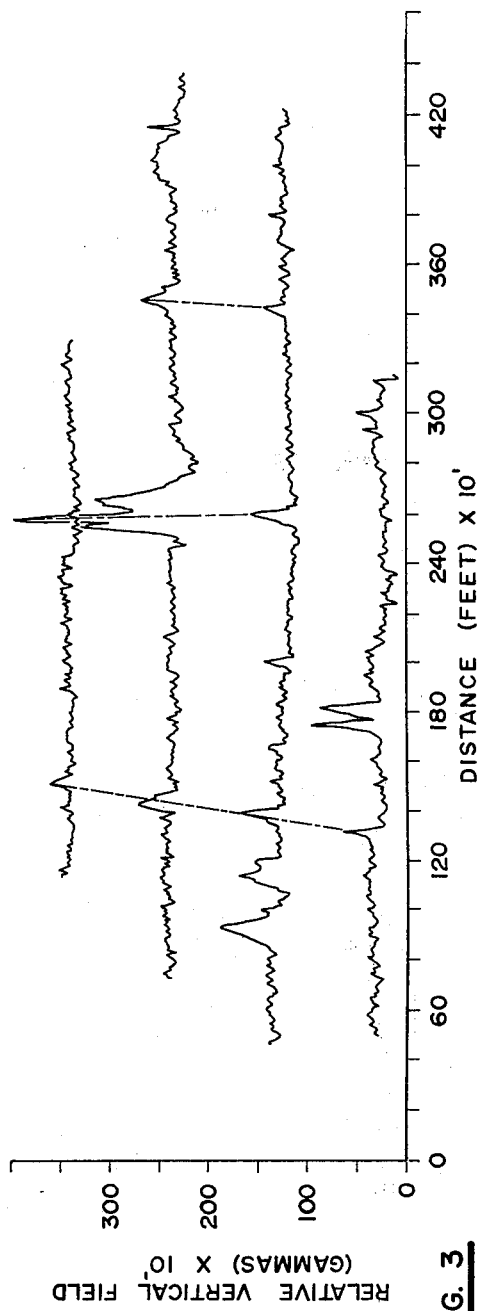
FIG. 3 illustrates the results of a survey using relatively small sampling distances and showing geologic features of relatively small width and long strike extent.
Figure 4:
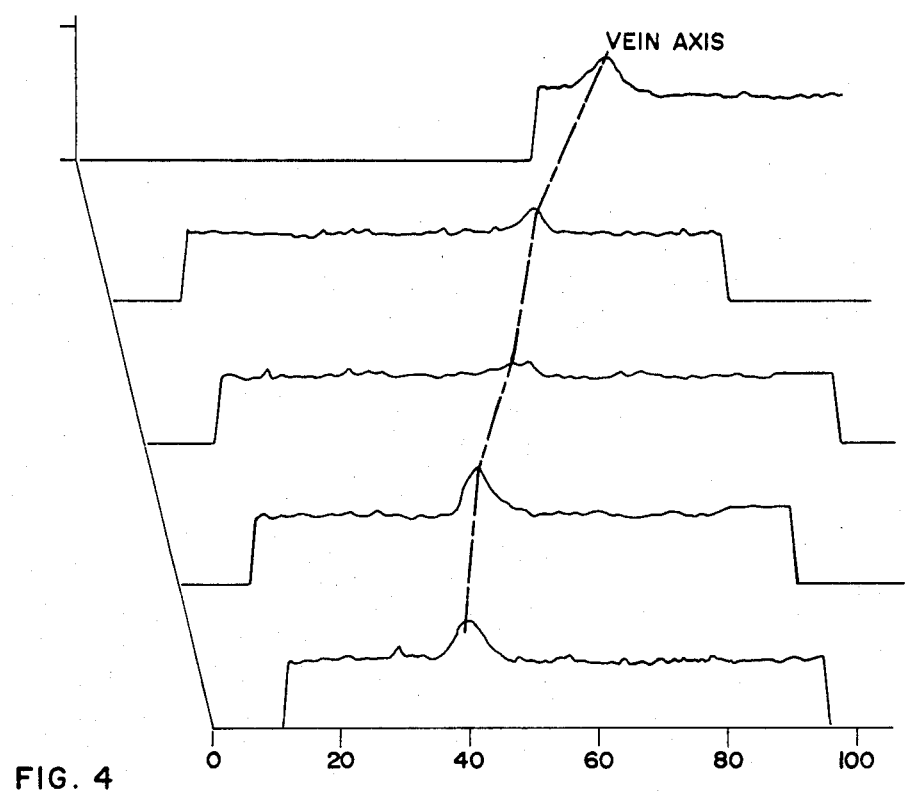
FIG. 4 illustrates the results of a survey taken with a sampling distance of two feet and indicating magnetic anomaly envelope of between five and ten feet in width.

We have found that the frequency and amplitude information collected by a detailed survey may be used as criteria, with which to define a particular feature or lithologic zone within an area. This technique then makes it possible to effectively map these features magnetically, beneath a cover of overburden, a problem common to many areas of the world and most notably the Precambrian shield areas. Another problem associated with the detection of geologic features of small width and long strike extent is the distinct possibility that such features may be missed by conventional magnetic surveys using sampling intervals of 50 or 100 feet. FIG. 3 shows one such situation where an economically viable vein system having average widths of less than 10 feet, and a corresponding strike of several hundred feet, containing fairly high percentages of zinc, copper and lead, with associated magnetite. FIG. 4 shows the magnetic survey results of the area using a very detailed sampling interval of 2 feet. The magnetic anomaly envelope associated with this veining, varied between 5 and 10 feet in width. This sort of geologic feature would be easily missed by conventional magnetic surveys using a 50 or 100 foot sampling interval. Therefore, by means of the previous development it has been shown that ground magnetic surveys using nearly continuous (less than 20 feet) or continuous sampling, are useful in two ways; first, by establishing frequency and amplitude characteristics to be used as geologic mapping and interpretation criteria, and secondly, to provide the requisite data redundancy to ensure complete ground coverage and reduce the probability of missing important small scale geologic features.

Figure 5:
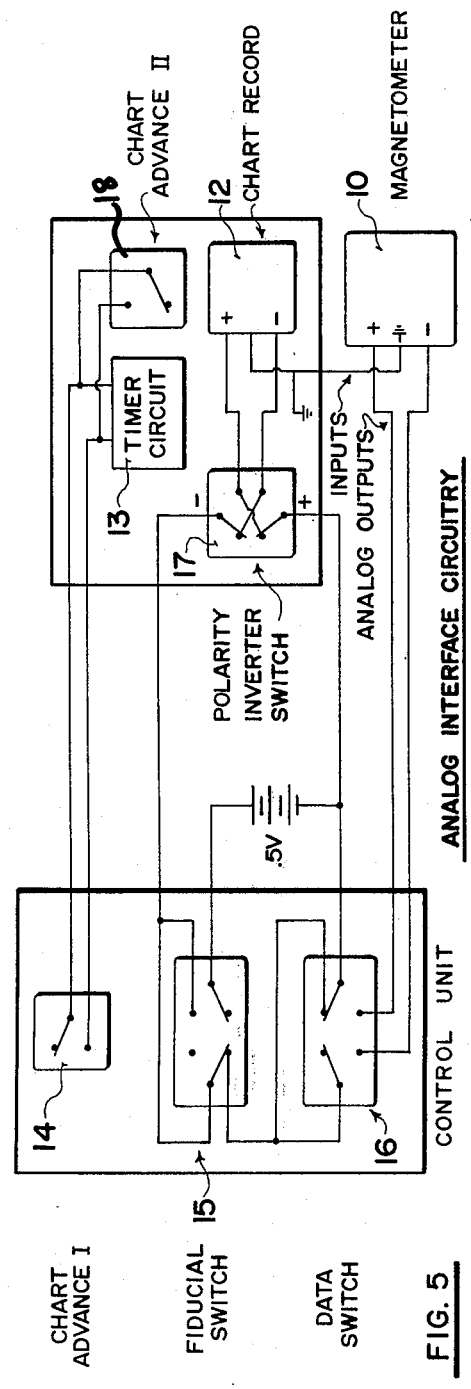
FIG. 5 is a block diagram of one embodiment of the apparatus for collecting and storing survey data taken on a nearly continuous basis.

In designing apparatus to perform detailed ground magnetic surveys to be used in mineral exploration, where continuous or nearly continuous sampling is used, one method of collecting and storing such magnetic data is presented, although it is apparent that other means and methods to accomplish the same purpose can be devised by those skilled in the art. FIG. 5 shows one such means in a block diagram. Reference character 10 shows a magnetic field sensor used to detect variations in magnetic field intensity of surface or sub-surface geologic structures or lithologic units, while the sensor is transported by suitable means in the course of a ground or near ground level magnetic survey. This detector may be a fluxgate, alkali vapor, proton precession, SQUID magnetometer, or other appropriate and well known field sensitive element. The output of the sensor 10 is switched by a manually operable single-throw/double-pole mechanical switch 16, but which may be any other suitable mechanical or electronic switching means. The output of data switch 16 acts as input to a manually operable polarity inversion switch 17, which in this embodiment is in the form of a double-throw/double-pole switch which controls the polarity configuration of the output of sensor 10, as this signal is input to recorder 12. Recorder 12 in this application, is an analog chart recorder providing a visually readable output record, but may be any suitable recording mechanism.

The magnetic field intensity in this case, is represented in graphical form by a discrete line perpendicular to the zero reference axis on the chart paper. The length of this line represents the magnitude of the magnetic field intensity value. If a continuous recording mode is used, a continuous analytical curve representing the magnetic field intensity may be used. If grid reference or other grid information is to be placed onto the graphical output of the recorder, a switch 15 is closed placing a fiducial mark on the recording medium or chart.

This switch 15, in this embodiment, is a single-throw/double-pole switch, inputting a small voltage into the recorder 12 reverse in polarity to that of the magnetometer signal. This small voltage (less than 0.5 v.dc) momentarily drives the recorder pen below the zero line on the chart record, producing a short spike along the edge of the chart recorder output, which may be used as a reference marker.

To advance the chart record forward one increment, or step of predetermined length, a switch 14 is closed momentarily. Switch 14 in this embodiment is a single-throw/single-pole switch which, when closed, triggers the electronic timing circuitry of a timer 13. The length of the time interval during which the stepper motor (motor which drives chart record forward) is in the "on" mode, is determined by circuit parameters within the timer circuit of the timer 13. This "on" time then determines the spacing between each discrete reading on the line graph of magnetic field intensity varia- tions.

If desired, the magnetic field information may be processed automatically by conventional apparatus, in order to correct for magnetic interference which may be caused by secular variations and solar flare activity.

Summarizing the operation of the apparatus, the operator starting at an initial location in a survey presses the switch 15 to place a fiducial mark on the chart establishing his first station.

He then presses the data switch 16 which records the magnetic value in the form of calibrated vertical line on the chart record 12.

He then presses the chart advance switch 14 which advances the chart record a fixed amount. This amount is determined by the timer circuit 13.

The operator then moves a certain distance (for example, 10 feet) in a certain direction to the next sampling position which movement takes a variable amount of time depending upon the terrain. At that point, he takes another recording by pressing the data switch 16 and the chart advance switch 14.

He then moves repeatedly to each survey station in turn.

At the end of one line in a survey, the operator can move in the opposite direction along a parallel line spaced to one side of the first line. During movement in this opposite direction, he uses the polarity inverter switch 17 to reverse the polarity of all of the recordings. The polarity inverter switch enables the chart record of the readings taken along the second line to be positioned immediately beneath the chart record of the readings along the first line so the survey can be aligned and laid in the form of a map which can then be readily analyzed.

A further chart advance switch indicated at 18 is provided in a separate area of the equipment adjacent the polarity inverter switch 17 so that when the polarity inverter switch 17 is operated, the chart advance switch 18 can also be operated a number of times so as to space a first series of the readings from a second series obtained with inverted polarity and during a movement on foot in the opposite direction to the first series.

Since various modifications can be made in our invention as hereinbefore described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An apparatus for conducting magnetic surveys of the surface or sub-surface geophysical structures or lithologies comprising support means, a magnetometer and recording means for directly recording readings from said magnetometer on a visual recording medium both of which are mounted on said support means for manual transportation by an operative whereby the operative can move from one recording location to the next on foot, said recording means including switch means manually operable by said operative for actuating the recording of a reading at said location from said magnetometer on said recording medium, manually operable switch means for advancing the recording medium in steps of predetermined length, manually operable switch means for actuating means for recording a fiducial mark on the recording medium and manually operable switch means for reversing the polarity of recording of chosen ones of said readings on said visual recording medium.

2. A method of conducting a magnetic survey using a magnetometer and recording means for directly recording readings from said magnetometer on a visual recording medium both of which are manually transportable by an operative whereby the operative can move from one recording location to the next on foot, the method comprising recording a first and a second series of readings from said magnetometer on the recording medium each reading of the series being taken at a respective one of said locations, after each reading advancing the visual recording medium a step of predetermined length and transporting on foot the magnetometer and recording means from the location to the next adjacent location, the magnetometer and recording means being transported on foot in the first series of readings from each location to the next in a first direction and after the first series of readings reversing the polarity of recording of a second series of readings on the recording medium and during said second series transporting on foot the magnetometer and recording means from each location on the next in a direction parallel and opposite to said first direction.

* * * * *